Sept. 30, 1924.  
P. M. CRU  
1,510,311  
INVALID'S VEHICLE  
Filed June 18, 1923
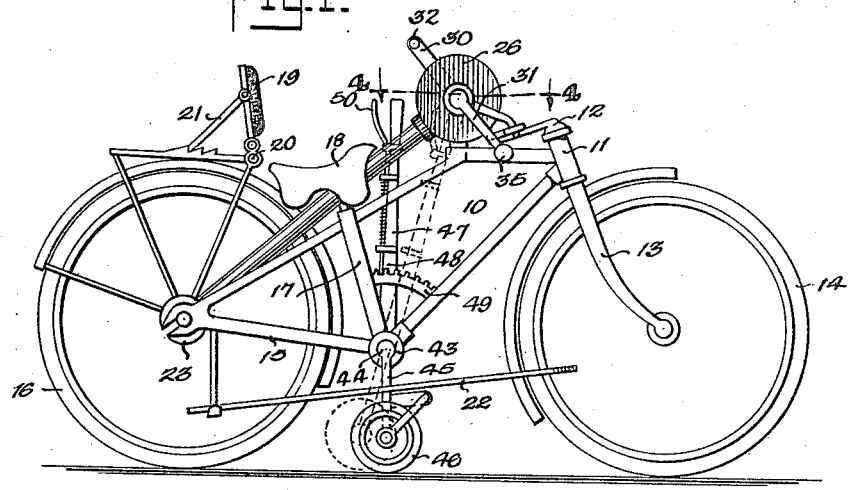
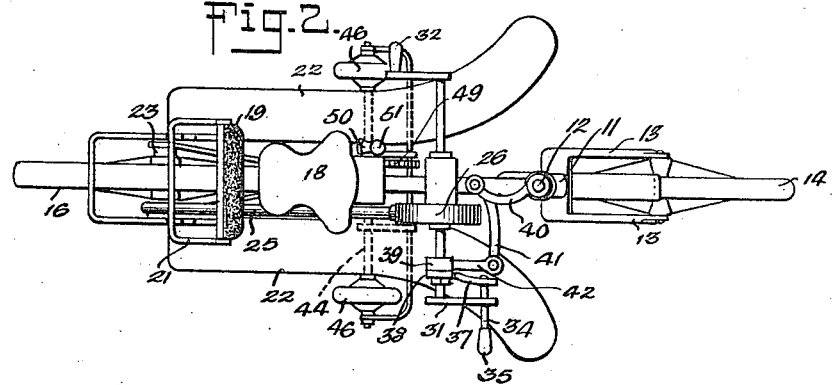
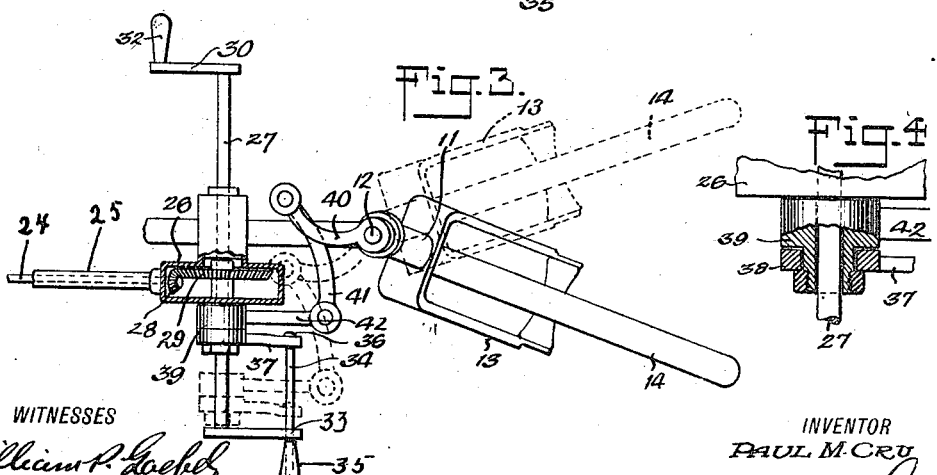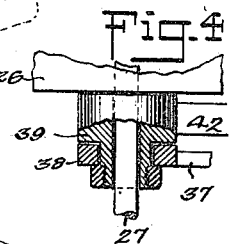
WITNESSES  
INVENTOR  
PAUL M. CRU  
BY  
ATTORNEYS Patented Sept. 30, 1924.

1,510,311

UNITED STATES PATENT OFFICE.

PAUL M. CRU, OF NEW YORK, N. Y.

INVALID'S VEHICLE.

Application filed June 18, 1923. Serial No. 646,236.

*To all whom it may concern:*

Be it known that I, PAUL M. CRU, a citizen of France, and a resident of the city of New York, borough of Manhattan, in the county and State of New York, have invented a new and Improved Invalid's Vehicle, of which the following is a full, clear, and exact description.

This invention has relation to vehicles and refers more particularly to a vehicle for invalids.

The principal object of the present invention is to provide a manually propelled vehicle for invalids which is capable of propulsion, steering or braking by a common manipulating mechanism from which it is unnecessary to remove the hands for accomplishing said operations.

More specifically the invention contemplates a vehicle in the nature of a bicycle which includes front and rear supporting wheels, the former being mounted for turning movement for steering the same and the latter constituting the driving means, together with a common manipulating means having connection with both wheels to afford means for propelling and steering the vehicle without removing the hands from the manipulating mechanism.

As a still further object the invention contemplates a vehicle of the character described which is provided with a balancing means for holding the same in an upright position when mounting, dismounting, starting or stopping, which means is rendered inactive when the vehicle has attained a sufficient speed or momentum to enable the rider to balance the same in the usual manner.

The invention furthermore contemplates a vehicle of the character set forth which is comparatively simple in construction and mode of operation, inexpensive to manufacture and highly efficient in its purpose.

In the drawings—

Figure 1 is a side view of a vehicle constructed in accordance with the invention.

Fig. 2 is a plan view thereof.

Fig. 3 is a fragmentary plan view with parts in section and illustrating in full and dotted lines the mode of steering the vehicle.

Fig. 4 is a fragmentary enlarged detail sectional view taken approximately on the line 4—4 of Fig. 1.

Referring to the drawings by characters of reference, 10 designates the vehicle frame which conforms substantially to the frame of an ordinary bicycle, the same being provided at its forward end with a substantially upright tubular bearing 11 in which the shank 12 of the front forks 13 is mounted for turning movement, the front supporting and steering wheel 14 being mounted in the free ends of the forks. Each rear forked portion 15 of the frame has journaled therein a rear supporting and driving wheel 16. The frame is provided with a substantially upright center post 17 which carries at its upper end the seat 18. It will be noted, however, that the center post 17 is shorter than that in the usual bicycle frame in order to dispose the seat lower. A suitable backrest 19 is pivoted as at 20 from the frame and is provided with means 21 for adjusting the same angularly in order to coact with the back of the rider to constitute a comfortable support therefor. An elongated pair of foot rests or running boards 22 are suspended from the frame in any desired manner. The rear wheel which is provided with the usual form of coaster brake mechanism 23 is driven by a shaft 24 extending through a tubular housing 25 and leads upwardly and forwardly at an angle to the interior of a casing 26 through which a transverse crank shaft 27 extends. The shafts 24 and 27 are coupled by the meshing beveled gears 28 and 29. The shaft 27 is provided adjacent its outer ends with crank arms 30 and 31, the former being provided with a handle 32 and the latter formed with a transverse opening 33 adjacent its free end through which the shank 34 of a laterally slidable handle 35 extends. The shank 34 is swiveled as at 36 in the free end of an arm 37 which is rotatably and slidably connected by a ring bearing 38 with a sleeve 39 mounted on the crank shaft 27 exteriorly of the casing 26. The upper end of the forked shank 12 has connected thereto a radial arm 40 which is connected by a connecting link 41 to an arm 42 extending forwardly from the bearing sleeve 39. The transverse bearing 43 disposed at the lower portion of the arm adjacent the intersection of the center post 17 therewith has mounted therein a transverse shaft 44 from the outer ends of which arms 45 depend. Balance wheels 46 are journaled in the lower ends of the arm 45 and the same are swung downwardly into engagement with the ground or supporting surface for the supporting wheels 14 and 16 by means of a lever 47 which is secured to the transverse shaft 44. The lever 47 is held in its adjusted positions by a latch 48 which cooperates with an arcuate rack 49, said latch being controlled by a manipulating handle 50 adjacent the grip 51 at the upper end of the lever 47.

In use and operation of the vehicle the lever 47 is operated to swing the balance wheels 46 into engagement with the ground or supporting surface whereby the vehicle is maintained in an upright position. After the rider has mounted the vehicle the handles 32 and 35 are grasped to turn the crank arms 30 and crank shaft 27 in a forward direction which through the medium of the meshing beveled gears 28 and 29 turns the driving wheel 16 to propel the vehicle forwardly. When the vehicle has attained a sufficient speed or momentum to enable the rider to balance the same by the weight of the body, the lever 47 is swung forwardly as illustrated in dotted lines in Fig. 1 to cause the balance wheels to be lifted or swung to a position out of engagement with the ground or supporting surface. In order to control or steer the vehicle, the operator pushes inwardly on the right handle 35 or pulls outwardly thereon to move the bearing sleeve 39 axially over the crank shaft 27. This effects either a pull or push on the connecting link 41 between the arm 42 and the arm 40 thereby turning the shank 12 of the fork 13 and simultaneously turning the front steering and supporting wheel 14. By turning backward on the crank shaft 27 the coaster brake 23 will function to permit of coasting or slowing up of the vehicle. Preparatory to stopping the vehicle the operator first slows up by gently applying the brake of the coaster brake mechanism in the usual manner and then manipulating the lever 47 to bring the balance wheels 46 in contact with the ground after which the vehicle may be brought to a full stop by fully applying the brake to the coaster brake mechanism.

It will thus be seen that a two-wheeled vehicle in the nature of a bicycle has been provided for invalids who cannot use the legs for propelling the same. It will be noted that the hand manipulating means for both steering and propelling the vehicle can be operated without removing the hands therefrom as well as the application of a brake when desired. It will be further noted that the hand grip 51 for manipulating the lever 47 is disposed at a point within easy reach of the operator.

I claim:

1. An invalid's vehicle including a frame, a dirigible front supporting wheel and rear supporting and driving wheel, a crank journaled in the frame and connected with the rear wheel for driving the same, a stationary crank handle and an axially movable crank handle on the crank shaft for turning the crank shaft, and a connection between the axially movable crank handle and the dirigible front wheel for effecting movements thereof to steer the vehicle.

2. An invalid's vehicle comprising a vehicle frame having a substantially vertical shank provided with a forked lower end journaled in the forward end of the same for turning movement, a supporting and steering wheel journaled in the forked end of the shank, a driving and supporting wheel journaled in the rear end of the frame, a transverse crank shaft journaled in the upper end of the frame having connection with the rear wheel for driving the same, crank arms secured to the opposite ends of the crank shaft, one of which crank arms is provided with a stationary handle and the opposite crank shaft with an apertured outer end, an axially slidable sleeve on the crank shaft provided with a radially projecting arm, a radially projecting arm at the upper end of the forked shank, a link connecting said arms, an arm rotatably carried by the axially movable sleeve, and a crank handle journaled in the outer end of the arm and projecting through the apertured crank arm.

PAUL M. CRU.